(12) United States Patent
El Idrissi et al.

(10) Patent No.: US 11,945,363 B2
(45) Date of Patent: Apr. 2, 2024

(54) METHOD FOR OPERATING AN AUTOMOTIVE LIGHTING DEVICE AND AUTOMOTIVE LIGHTING DEVICE

(71) Applicant: VALEO VISION, Bobigny (FR)

(72) Inventors: Hafid El Idrissi, Bobigny (FR); Rabih Taleb, Bobigny (FR)

(73) Assignee: Valeo Vision, Bobigny (FR)

( * ) Notice: Subject to any disclaimer, the term of this patent is extended or adjusted under 35 U.S.C. 154(b) by 0 days.

(21) Appl. No.: 18/253,725

(22) PCT Filed: Nov. 22, 2021

(86) PCT No.: PCT/EP2021/082556
§ 371 (c)(1),
(2) Date: May 19, 2023

(87) PCT Pub. No.: WO2022/112193
PCT Pub. Date: Jun. 2, 2022

(65) Prior Publication Data
US 2023/0415636 A1    Dec. 28, 2023

(30) Foreign Application Priority Data
Nov. 27, 2020   (FR) ...................................... 2012303

(51) Int. Cl.
*H05B 45/18* (2020.01)
*B60Q 1/04* (2006.01)
(Continued)

(52) U.S. Cl.
CPC ......... *B60Q 1/0408* (2013.01); *B60Q 1/1423* (2013.01); *H05B 45/18* (2020.01); *H05B 47/155* (2020.01); *B60Q 2300/05* (2013.01)

(58) Field of Classification Search
CPC ...... H05B 45/18; H05B 47/155; H05B 47/16; B60Q 1/14–143
See application file for complete search history.

(56) References Cited

U.S. PATENT DOCUMENTS 8,514,210 B2    8/2013  Roberts et al.
2008/0224634 A1*  9/2008  Scilia ..................... H05B 45/18
                                                           315/192
(Continued)

OTHER PUBLICATIONS

European Patent Office, International Search Report and Written Opinion of corresponding International Application No. PCT/EP2021/082556, dated Mar. 10, 2022.
(Continued)

*Primary Examiner* — Sean P Gramling
(74) *Attorney, Agent, or Firm* — Valeo Vision (57) ABSTRACT

A method for operating an automotive lighting device including providing a first preliminary current profile, calculating a first preliminary derating time associated to the first preliminary current profile, providing a second preliminary current profile, calculating a second preliminary derating time associated to the second preliminary current profile, feeding the first light module with a first current profile which provides a total amount of current lower than the first preliminary amount of current, and feeding the second light module with a second current profile which provides a total amount of current higher than the second preliminary amount of current.

15 Claims, 5 Drawing Sheets

(51) Int. Cl.
*B60Q 1/14* (2006.01)
*H05B 47/155* (2020.01)

(56) References Cited

U.S. PATENT DOCUMENTS

2012/0032600 A1    2/2012  Edwards et al.
2014/0361685 A1*  12/2014  Yamamichi ........... F21S 41/148
                                                              315/53
2016/0003670 A1    1/2016  Li et al.

OTHER PUBLICATIONS

India Patent Office, First Exam Report of corresponding Indian Patent Application No. 202347036630, dated Dec. 27, 2023.

* cited by examiner

METHOD FOR OPERATING AN AUTOMOTIVE LIGHTING DEVICE AND AUTOMOTIVE LIGHTING DEVICE

TECHNICAL FIELD

This invention is related to the field of automotive lighting devices, and more particularly, to the temperature control of these light sources comprised in these devices.

BACKGROUND OF THE INVENTION

Digital lighting devices are being increasingly adopted by car makers for middle and high market products.

These digital lighting devices usually comprise solid-state light sources, the operation of which heavily depends on temperature.

Temperature control in these elements is a very sensitive aspect, and is usually carried out by derating, which means decreasing the current value which feeds the light source so that the output flux and the operation temperature decreases accordingly. This causes that the performance of the light sources must be heavily oversized to face these overheating problems, so that the operation values may be decreased while still maintaining acceptable values.

Maintaining an optimal performance into a headlamp regardless the driving conditions is very difficult. Very often, one lighting module heats faster than others, thus penalizing the remainder lighting modules because of the high interior temperature of the HL. This phenomenon is not optimal because when a light module suffers derating, the rest of the modules are also affected to guarantee an acceptable homogeneity, despite the fact that they have not reached the derating threshold yet.

This problem has been assumed until now, but a solution therefor is provided.

SUMMARY OF THE INVENTION

The invention provides an alternative solution for managing the temperature of the light sources of an automotive lighting device by a method for operating an automotive lighting device and an automotive lighting device according to the invention. Preferred embodiments of the invention are defined in dependent claims.

Unless otherwise defined, all terms (including technical and scientific terms) used herein are to be interpreted as is customary in the art. It will be further understood that terms in common usage should also be interpreted as is customary in the relevant art and not in an idealised or overly formal sense unless expressly so defined herein.

In this text, the term "comprises" and its derivations (such as "comprising", etc.) should not be understood in an excluding sense, that is, these terms should not be interpreted as excluding the possibility that what is described and defined may include further elements, steps, etc.

In a first inventive aspect, the invention provides a method for operating an automotive lighting device comprising at least a first light module and a second light module, each one of the light modules comprising solid-state light sources, the method comprising the steps of:

providing a first preliminary current profile to feed the first light module, the first preliminary current profile having a first flux mean value;

estimating a first preliminary derating time associated to the first preliminary current profile;

providing a second preliminary current profile to feed the second light module, the second preliminary current profile having a second flux mean value;

estimating a second preliminary derating time associated to the second preliminary current profile, the second preliminary derating time being higher than the first preliminary derating time;

feeding the first light module with a first current profile which provides a flux mean value lower than 0.96 times the first flux mean value; and feeding the second light module with a second current profile which provides a flux mean value higher than 1.04 times the second flux mean value.

The fact that the calculated second preliminary derating time is higher than the first preliminary derating time means that the preliminary derating time is calculated for both light modules, and then the first light module is the one with a lower derating time and the second light module is the one with a higher derating time.

In the state of the art, the preliminary derating time of the first module will jeopardize the performance of the whole lighting device, since it causes the second lighting module to undergo the derating despite the second module would not still need it. However, in the method of the present invention, the derating time of the second light module is lower than the second preliminary derating time to cause an increase the derating time of the first light module. Hence, the global derating time is extended, obtaining a good performance during a longer time period maintaining the flux homogeneity.

Due to the high variation in the current profile, the difference in the derating time of the light modules may be compensated. This method is especially advantageous when the difference between the estimated derating times is high.

In some particular embodiments, the first current profile and the second current profile comprise starting with a first current value and increasing the current value when a predetermined condition is reached.

With this approach, the first and second current profiles are optimized to provide the minimum current needed in each moment, having the ability of increasing the current if needed.

In some particular embodiments, the step of obtaining the first current value is carried out by a machine learning algorithm which obtains information from vehicle sensors.

The machine learning algorithm obtains information from different sensors of the vehicle and is trained and tested in different situations to obtain the maximum derating time for the less favourable light module.

This machine learning algorithm may be located in the cloud or embedded in the control unit of the vehicle.

In some particular embodiments, the vehicle sensors include at least some of temperature sensors, a vehicle speed sensor, a geopositioning sensor and radar or lidar sensors.

In some particular embodiments, the predetermined condition includes the fact that a measured luminous flux value falls below the corresponding flux threshold value.

The luminous flux value is an important parameter, although it is not the only one that provides information about the lighting device operation. Controlling the current value with the luminous flux ensures an acceptable operation of the sum of the lighting modules.

In some particular embodiments, the method further comprises the step of obtaining a light source temperature and wherein the predetermined condition includes the fact that the light source temperature reaches a predetermined value.

A different but compatible way of controlling the current is by means of the temperature, which may provide indirect data of luminous flux.

In some particular embodiments, the predetermined condition includes the fact that a time limit has been reached.

A different way of controlling the current is just by a timer, estimating the temperature evolution with time. In these cases, there is no need of measuring any data, and the current is automatically being increased. This may be done when a time pattern has been solidly established.

In some particular embodiments, the step of increasing the current value involves increasing the current value from a first value to a second value, the second value being greater than the first value but lower than 1.1 times the first value, particularly lower than 1.05 times the first value and particularly lower than 1.03 times the first value.

In these examples, the current may be increased in small ranges, so that the current value (and the temperature) are kept as low as possible within a range which provides an acceptable performance.

In some particular embodiments, the method further comprises the step of recording a sequence of current value increments for predetermined conditions.

This sequence may be useful if using a time-based pattern, to avoid a continuous temperature measurement.

In some particular embodiments, the first light module is a low beam module and the second light module is a high beam module. This has some synergistic effects, since the low beam and high beam modules are sometimes operated simultaneously.

In some particular embodiments, the steps of the method are applied to at least 10% of the light sources of the corresponding light module.

The progressive increase in the current value may be applied to a great number of light sources at the same time, for example, all the light sources providing a predetermined functionality. The power saving and homogeneous performance may therefore be applied to a great amount of elements.

In some particular embodiments, the method further comprises the step of obtaining a light source temperature and the rest of the steps of the method are triggered when the light source temperature reaches a predetermined value.

The system does not need to constantly supervise the temperature and the derating time. Creating a temperature threshold helps the system to be more relaxed and reduces its power consumption.

In some particular embodiments, the first current profile provides a flux mean value lower than 0.94 times the first flux mean value, and more particularly lower than 0.91 times the first flux mean value. In turn, the second current profile provides a flux mean value higher than 1.06 times the second flux mean value, and more particularly higher than 1.09 times the first flux mean value.

With these values, which may in some cases compromise the homogeneity of the projected light pattern, a surprising derating time results are obtained. In some cases, thermal stabilization may be achieved.

In some particular embodiments, the estimation of the first and/or second preliminary derating time is carried out using an artificial intelligence algorithm, which has been previously trained with a training dataset. In some particular embodiments, the artificial intelligence algorithm includes a question tree structure with questions, so that the answer to the questions provide a final score which is transformed into a derating time value.

These kind of methods use a training dataset, which is a group of experimental data with different parameters, such as temperature measurements (from thermistors installed around the lighting device, exterior temperatures, estimated temperatures, . . . ), vehicle speed, road conditions, weather, day/night, other active lighting functionalities, thermal control parameters (LED dimming, derating in other modules, fan speed) and physical headlamp parameters. These values are associated to an experimentally known value of derating time. The control unit is taught to estimate the derating time correctly with the use of the provided parameters, so that, when faced to real conditions, the estimation of real derating time is as accurate as possible.

In some particular embodiments, the artificial intelligence algorithm includes a ridge regression algorithm.

The use of a ridge regression algorithm is advantageous, since the data used in this method suffer from multicollinearity: there is a direct link between the behaviour of some of the parameters used in the method, such as the activated lighting function, the duration and the temperature measurements of each module. In addition, heat in one light module has a direct impact on the temperature evolution of other light modules. In some cases, a lighting pattern is built by using different modules, so the derating of the lighting functionality depends on the derating time of different modules. When multicollinearity occurs, least squares estimates are unbiased, but their variances are large which could introduce a very high error of estimation (prediction). Ridge regression algorithms allows the addition of a degree of bias to the regression estimates which will reduce the standard errors.

In some particular embodiments, the steps of feeding the first light module with a first current profile and feeding the second light module with a second current profile are not simultaneous, but feeding of the first current profile is performed firstly, and then, after a time gap, feeding of the second current profile is performed secondly.

This helps for an even better derating time, since the operation of increasing the current is delayed until necessary.

In a second inventive aspect, the invention provides an automotive lighting device comprising:

a first light module comprising a plurality of solid-state light sources;

a second light module comprising a plurality of solid-state light sources;

a control element for performing the steps of the method according to the first inventive aspect;

The term "solid state" refers to light emitted by solid-state electroluminescence, which uses semiconductors to convert electricity into light. Compared to incandescent lighting, solid state lighting creates visible light with reduced heat generation and less energy dissipation. The typically small mass of a solid-state electronic lighting device provides for greater resistance to shock and vibration compared to brittle glass tubes/bulbs and long, thin filament wires. They also eliminate filament evaporation, potentially increasing the lifespan of the illumination device. Some examples of these types of lighting comprise semiconductor light-emitting diodes (LEDs), organic light-emitting diodes (OLED), or polymer light-emitting diodes (PLED) as sources of illumination rather than electrical filaments, plasma or gas.

This lighting device provides the advantageous functionality of efficiently managing the performance of the light sources.

BRIEF DESCRIPTION OF DRAWINGS

In some particular embodiments, the automotive lighting device comprises further comprising a thermistor intended to measure the temperature of the solid-state light sources.

DETAILED DESCRIPTION OF THE INVENTION

In these figures, the following reference numbers have been used:
1 First light module
2 Second light module
3 LED
4 Control element
5 Thermistors
6 Temperature threshold
7 Temperature trigger value
10 Lighting device
11 First preliminary curve for first module
11' Invention curve for the first module
12 First preliminary curve for second module
12' Invention curve for the second module
13 First preliminary current profile
14 First modified current profile
21 First preliminary derating temperature for first module
21' Invention derating time for the first light module 22 Second preliminary derating temperature for second module
22' Invention derating time for the second light module
23 Second preliminary current profile
24 Second modified current profile
100 Automotive vehicle The example embodiments are described in sufficient detail to enable those of ordinary skill in the art to embody and implement the systems and processes herein described. It is important to understand that embodiments can be provided in many alternate forms and should not be construed as limited to the examples set forth herein.

Accordingly, while embodiment can be modified in various ways and take on various alternative forms, specific embodiments thereof are shown in the drawings and described in detail below as examples. There is no intent to limit to the particular forms disclosed. On the contrary, all modifications, equivalents, and alternatives falling within the scope of the appended claims should be included.

Figure 1:
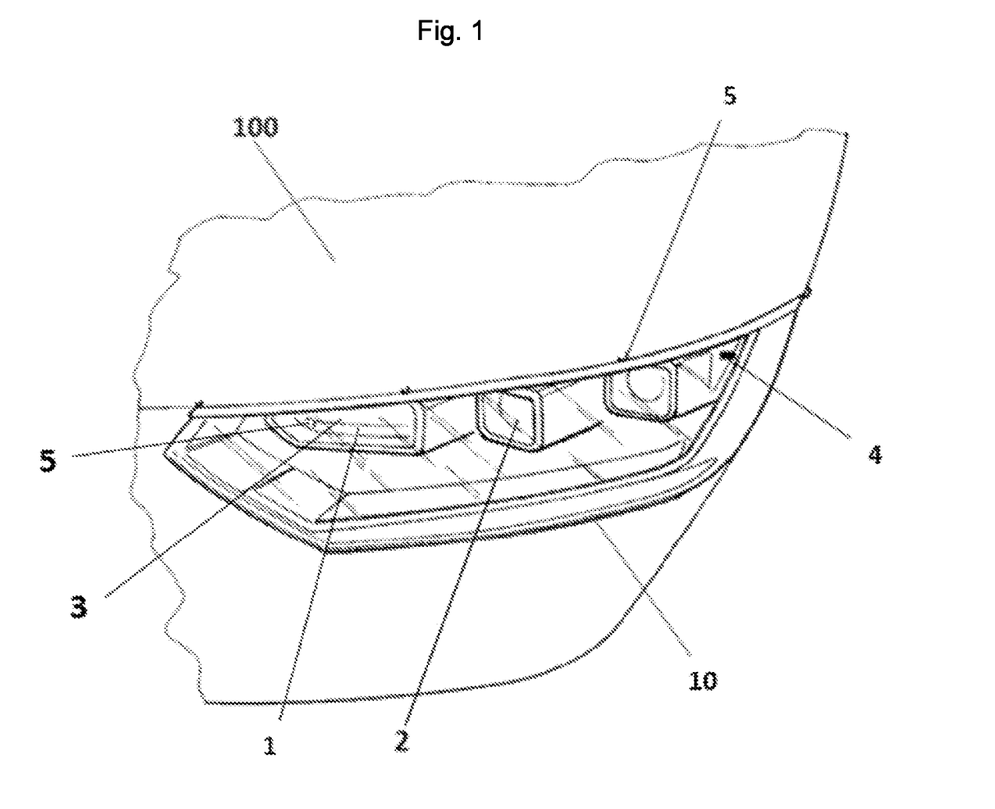
FIG. 1 shows a general perspective view of an automotive lighting device according to the invention.

FIG. 1 shows a general perspective view of an automotive lighting device according to the invention.

This lighting device 10 is installed in an automotive vehicle 100 and comprises
a first light module 1 comprising a plurality of LEDs 3;
a second light module 2 comprising a plurality of LEDs 3;
a control element 4;
a plurality of thermistors 5 intended to measure the temperature in different sections of the first and second light modules.

Each of the light modules is a high-resolution module, having a resolution greater than 2000 pixels. However, no restriction is attached to the technology used for producing the projection modules.

A first example of this matrix configuration comprises a monolithic source. This monolithic source comprises a matrix of monolithic electroluminescent elements arranged in several columns by several rows. In a monolithic matrix, the electroluminescent elements can be grown from a common substrate and are electrically connected to be selectively activatable either individually or by a subset of electroluminescent elements. The substrate may be predominantly made of a semiconductor material. The substrate may comprise one or more other materials, for example non-semiconductors (metals and insulators). Thus, each electroluminescent element/group can form a light pixel and can therefore emit light when its/their material is supplied with electricity. The configuration of such a monolithic matrix allows the arrangement of selectively activatable pixels very close to each other, compared to conventional light-emitting diodes intended to be soldered to printed circuit boards. The monolithic matrix may comprise electroluminescent elements whose main dimension of height, measured perpendicularly to the common substrate, is substantially equal to one micrometer.

The monolithic matrix is coupled to the control center so as to control the generation and/or the projection of a pixelated light beam by the matrix arrangement. The control center is thus able to individually control the light emission of each pixel of the matrix arrangement.

Alternatively to what has been presented above, the matrix arrangement may comprise a main light source coupled to a matrix of mirrors. Thus, the pixelated light source is formed by the assembly of at least one main light source formed of at least one light emitting diode emitting light and an array of optoelectronic elements, for example a matrix of micro-mirrors, also known by the acronym DMD, for "Digital Micro-mirror Device", which directs the light rays from the main light source by reflection to a projection optical element. Where appropriate, an auxiliary optical element can collect the rays of at least one light source to focus and direct them to the surface of the micro-mirror array.

Each micro-mirror can pivot between two fixed positions, a first position in which the light rays are reflected towards the projection optical element, and a second position in which the light rays are reflected in a different direction from the projection optical element. The two fixed positions are oriented in the same manner for all the micro-mirrors and form, with respect to a reference plane supporting the matrix of micro-mirrors, a characteristic angle of the matrix of micro-mirrors defined in its specifications. Such an angle is generally less than 20° and may be usually about 12°. Thus, each micro-mirror reflecting a part of the light beams which are incident on the matrix of micro-mirrors forms an elementary emitter of the pixelated light source. The actuation and control of the change of position of the mirrors for selectively activating this elementary emitter to emit or not an elementary light beam is controlled by the control center.

In different embodiments, the matrix arrangement may comprise a scanning laser system wherein a laser light source emits a laser beam towards a scanning element which is configured to explore the surface of a wavelength converter with the laser beam. An image of this surface is captured by the projection optical element.

The exploration of the scanning element may be performed at a speed sufficiently high so that the human eye does not perceive any displacement in the projected image.

The synchronized control of the ignition of the laser source and the scanning movement of the beam makes it possible to generate a matrix of elementary emitters that can be activated selectively at the surface of the wavelength converter element. The scanning means may be a mobile micro-mirror for scanning the surface of the wavelength converter element by reflection of the laser beam. The micro-mirrors mentioned as scanning means are for example MEMS type, for "Micro-Electro-Mechanical Systems". However, the invention is not limited to such a scanning means and can use other kinds of scanning means, such as a series of mirrors arranged on a rotating element, the rotation of the element causing a scanning of the transmission surface by the laser beam.

In another variant, the light source may be complex and include both at least one segment of light elements, such as light emitting diodes, and a surface portion of a monolithic light source.

Since there is a great amount of light sources very close to each other, thermal control is very important to ensure a good performance and efficiency.

Figure 2:
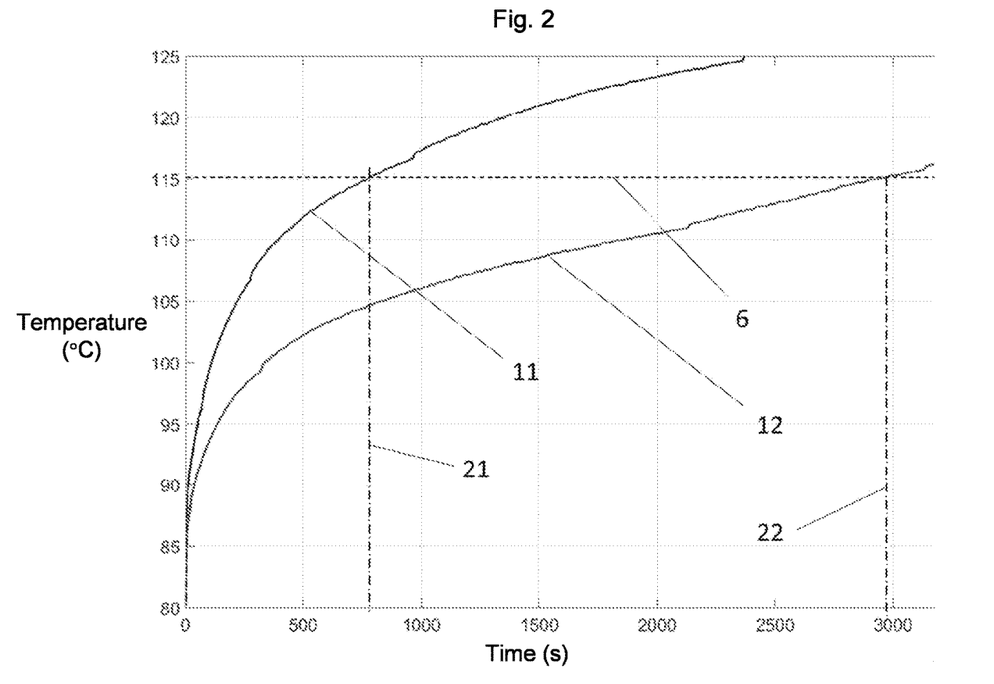
FIG. 2 shows a graphic scheme of the standard operation of the two light modules of the lighting device when no method according to the invention applies.

FIG. 2 shows a graphic scheme of the standard operation of the two light modules of the lighting device when no method according to the invention applies.

According to this figure, the first light module follows the first curve 11, increasing its temperature with time. When a first preliminary derating time 21 is reached, the first light module reaches the maximum temperature threshold 6 and needs to be derated to avoid damages.

Analogously, the second light module, if installed alone, would follow the second curve 12, increasing its temperature with time. When a second preliminary derating time 22 was reached, the second light module would have reached the maximum temperature threshold 6 and needs to be derated to avoid damages. The fact is that, since the second light module is installed together with the first light module, which has a lower derating time, the second light module would need to be derated at the first preliminary derating time, which happens before the second preliminary derating time, to guarantee the homogeneity of the beam and to respect the regulations, which does not allow the use of a high beam module without operating the low beam module.

Figure 3:
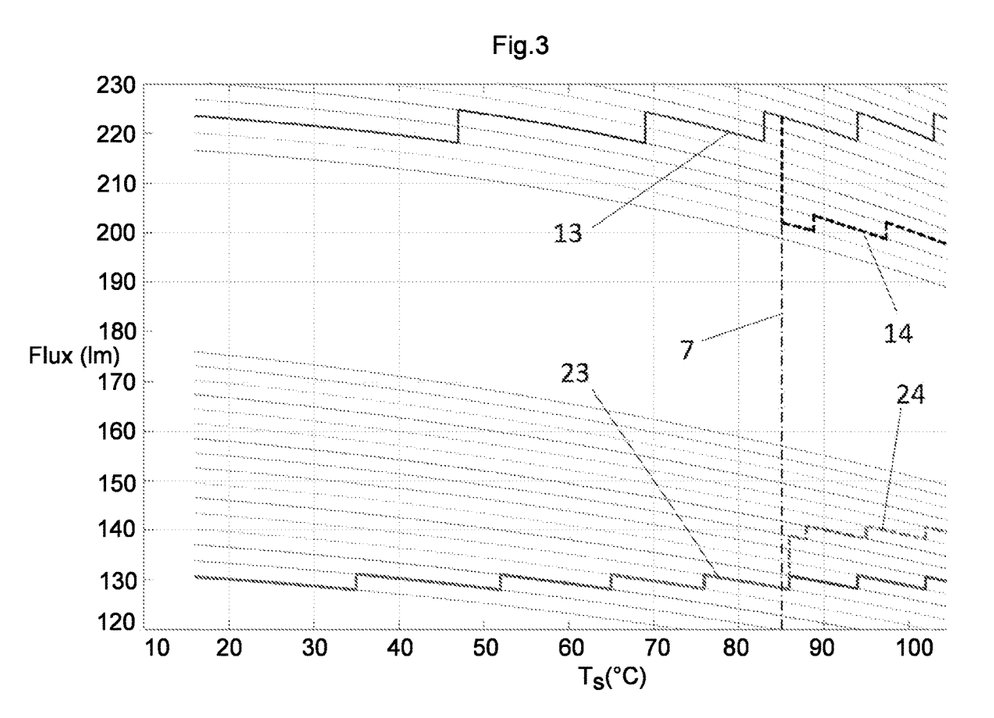
FIG. 3 shows the evolution of the flux-temperature curves of the first and second modules when an operation according to the method of the invention is followed.

FIG. 3 shows the evolution of the flux-temperature curves of the first and second modules when an operation according to the method of the invention is followed.

First module follows a preliminary current profile 13 but, when a predetermined temperature 7 is reached in this first light module, the method of the invention triggers, and a first preliminary derating time is estimated. A particular example of this estimation will be described in FIG. 5.

Second module, in turn, follows a preliminary current profile 23 and when the method is triggered, a second preliminary derating time is estimated as well, following the same method.

In a real scenario, the module with a higher preliminary derating time will be considered as the second light module.

When the method is triggered, the first light module current profile is switched to a current profile 14 which provides a flux mean value which is 0.9 times the flux mean value that the first light module had before the triggering of the method. In turn, the second light module current profile is switched to a current profile 24 which provides a flux mean value which is 1.1 times the flux mean value that the second light module had before the triggering of the method.

In some cases, the decrease of the current profile in the first module is carried out first, and then, when the total flux of the light pattern reaches a low threshold according to the regulations, the current profile of the second module is increased. With this scenario, the derating time is even improved.

These changes have a negative impact on the homogeneity of the resulting light pattern, but are carried out to keep the total luminous flux, which is preserved. By such a substantial current decrease, the derating time of the second module is highly increased, sometimes achieving a thermal stabilization.

In this figure, it may be observed how the current profile does not mean a constant value of current, but a slight variation. A reference value is chosen, and then the intensity may suffer slight increases to keep a flux mean value which satisfies the condition of the method described above.

Figure 4:
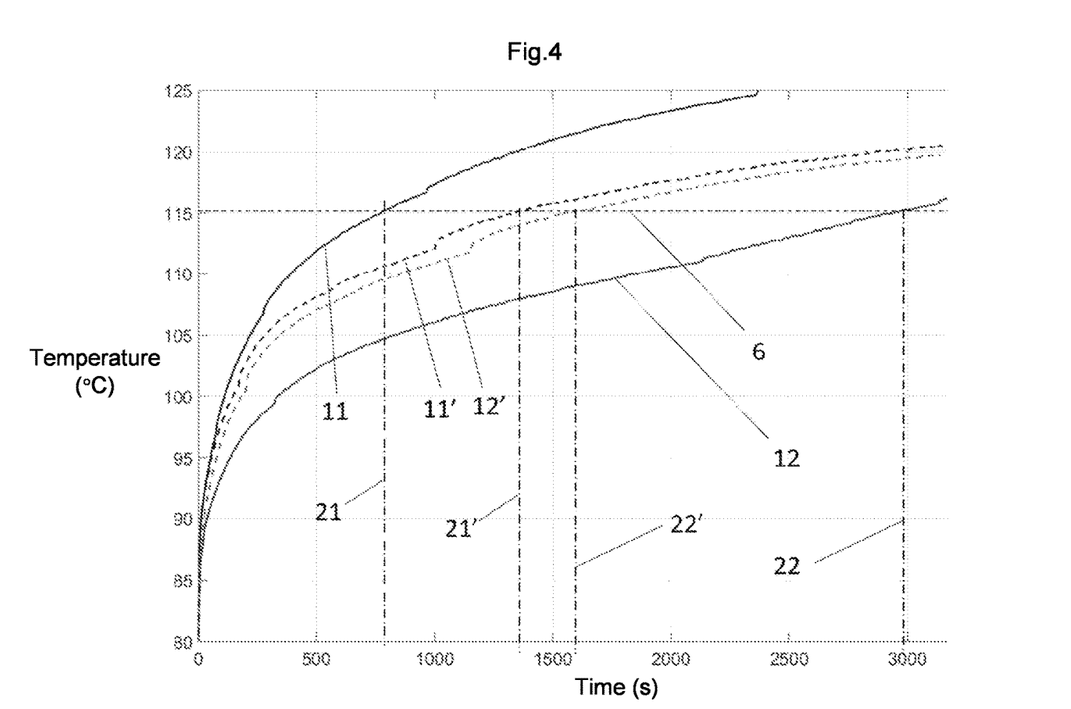
FIG. 4 shows the effect of the temperature over time produced by the method described in FIG. 3.

FIG. 4 shows the effect of the temperature over time produced by the method described in FIG. 3.

In this graphic, the temperature over time is shown for both light modules. The upper part of the graphic shows the evolution for first light module. If no decision was taken, as shown in FIG. 2, the first curve 11 would provide a first derating time 21 and the second curve 12 would provide a derating time 22.

However, due to the decision of increasing and decreasing the flux mean value in the lighting modules, the first module does not follow the first curve 11, but the modified curve 11' and the second module does not follow the second curve 12, but the modified curve 12'. The first module does not reach the temperature threshold 6 in the first derating time 21, but in a modified derating time 21' and the second module does not reach the temperature threshold 6 in the second derating time 22, but in a modified derating time 22'. Since the derating time of the global functionality is the lower between the first derating time and the second derating time, the first derating time, which is always lower than the second derating time, will decide the derating time of the lighting functionality. Since it has been improved from the first derating time 21 to the modified derating time 21', the derating time of the global lighting functionality is improved.

Figure 5:
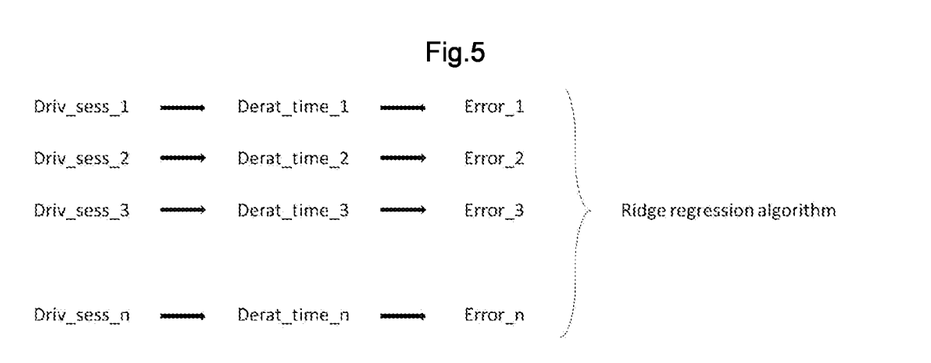
FIG. 5 shows a particular example of how the system is trained and tested.

FIG. 5 shows a particular example of how the system is trained and tested. Different examples with different training datasets are provided. Each example contains a typical driving session, where different parameters are measured along the time: temperature measurements (from thermistors installed around the lighting device, exterior temperatures, estimated temperatures, . . . ), vehicle speed, road conditions, weather, day/night, other active lighting functionalities, thermal control parameters (LED dimming, derating in other modules, fan speed) and physical headlamp parameters. Each of these datasets are associated to an experimentally known value of derating time. These values are introduced in the system, and the control unit estimates a derating time. The estimated derating time is compared with the experimental one, so that an error is calculated.

Each training dataset is therefore associated to an error value. Then, due to the multicollinearity of the different values and parameters, a ridge regression algorithm is used to create the supervision rules that will feed the control unit to improve the derating time estimation.

What is claimed is:

1. A method for operating an automotive lighting device including at least a first light module and a second light module, with each one of the light modules including solid-state light sources, the method comprising:
- providing a first preliminary current profile to feed the first light module, the first preliminary current profile having a first flux mean value;
- estimating a first preliminary derating time associated to the first preliminary current profile;
- providing a second preliminary current profile to feed the second light module, the second preliminary current profile having a second flux mean value;
- estimating a second preliminary derating time associated to the second preliminary current profile, the second preliminary derating time being higher than the first preliminary derating time;
- feeding the first light module with a first current profile which provides a flux mean value lower than 0.96 times the first flux mean value; and
- feeding the second light module with a second current profile which provides a flux mean value higher than 1.04 times the second flux mean value.

2. The method according to claim 1, further comprising obtaining the first current profile and the second current profile by starting with a first current value and increasing the current value when a predetermined condition is reached.

3. The method according to claim 2, wherein obtaining the first current value is carried out by a machine learning algorithm which obtains information from vehicle sensors.

4. The method according to claim 1, further comprising obtaining a light source temperature.

5. The method according to claim 1, wherein the first current profile provides a flux mean value lower than 0.94 times the first flux mean value.

6. The method according to claim 1, wherein the second current profile provides a flux mean value higher than 1.06 times the second flux mean value.

7. The method according to claim 1, wherein the estimation of the first and/or second preliminary derating time is carried out using an artificial intelligence algorithm, which has been previously trained with a training dataset.

8. The method according to claim 7, wherein the artificial intelligence algorithm includes a ridge regression algorithm.

9. The method according to claim 1, wherein feeding the first light module with a first current profile and feeding the second light module with a second current profile are not simultaneous, but feeding of the first current profile is performed firstly, and then, after a time gap, feeding of the second current profile is performed secondly.

10. The method according to claim 1, wherein the first light module is a low beam module and the second light module is a high beam module.

11. The method according to claim 1, wherein the first current profile and the second current profile are applied to at least 10% of the light sources of the corresponding light module.

12. The method according to claim 1, wherein the first current profile provides a flux mean value lower than 0.91 times the first flux mean value.

13. The method according to claim 1, wherein the second current profile provides a flux mean value higher than 1.09 times the first flux mean value.

14. An automotive lighting device comprising:
- a first light module comprising a plurality of solid-state light sources;
- a second light module comprising a plurality of solid-state light sources;
- a control element configured to:
- provide a first preliminary current profile to feed the first light module, the first preliminary current profile having a first flux mean value;
- estimate a first preliminary derating time associated to the first preliminary current profile;
- provide a second preliminary current profile to feed the second light module, the second preliminary current profile having a second flux mean value;
- estimate a second preliminary derating time associated to the second preliminary current profile, the second preliminary derating time being higher than the first preliminary derating time;
- feed the first light module with a first current profile which provides a flux mean value lower than 0.96 times the first flux mean value; and
- feed the second light module with a second current profile which provides a flux mean value higher than 1.04 times the second flux mean value.

15. The automotive lighting device according to claim 14, further comprising a thermistor intended to measure the temperature of the solid-state light sources.

* * * * *